J. C. PRESTON AND J. MALCOLM.
NURSERY SERVICE WAGON.
APPLICATION FILED JULY 2, 1919.

1,353,180. Patented Sept. 21, 1920.

INVENTORS:
John Charles Preston
James Malcolm
By Wm. Wallace White
ATT'Y

UNITED STATES PATENT OFFICE.

JOHN CHARLES PRESTON, OF BALMAIN, NEAR SYDNEY, NEW SOUTH WALES, AND JAMES MALCOLM, OF LINDFIELD, NEAR SYDNEY, AUSTRALIA.

NURSERY SERVICE-WAGON.

1,353,180.	Specification of Letters Patent.	Patented Sept. 21, 1920.

Application filed July 2, 1919. Serial No. 308,194.

*To all whom it may concern:*

Be it known that we, JOHN CHARLES PRESTON and JAMES MALCOLM, subjects of the King of Great Britain and Ireland, residing, respectively, at Louisa Road, Balmain, near Sydney, New South Wales, Australia, and at Highfield Road, Lindfield, near Sydney aforesaid, have invented certain new and useful Improvements in Nursery Service-Wagons, of which the following is a specification.

This invention consists in a double decked service-wagon, adapted for nursery use by providing the upper tray with a drop-down section and fixing means therefor to form an infant's safety chair. The wagon is thus endowed with special utility, as it may be used either as an ordinary service wagon, or as an infant's play chair having spare tray capacity which may be utilized for carrying viands, sewing materials, or other articles, accessibly.

Figure 1:
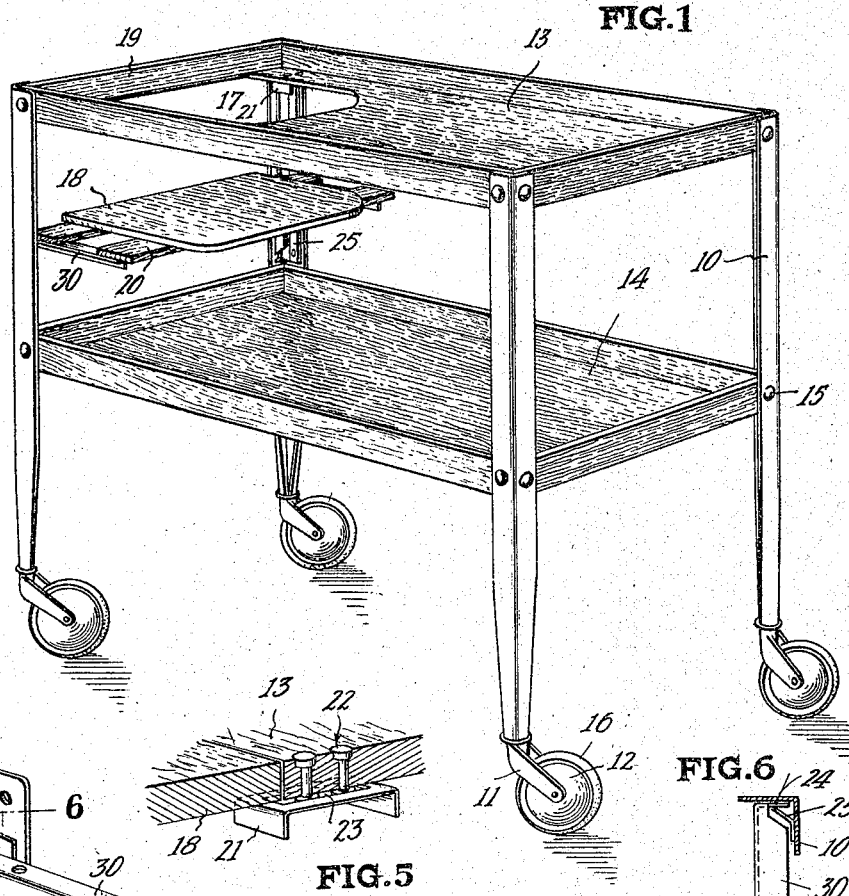
Figure 2:
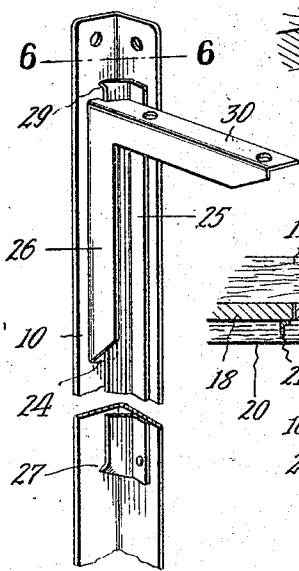
Figure 5:
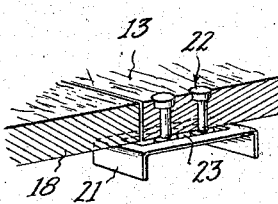
Figure 6:
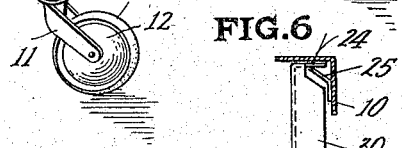
Figure 3:
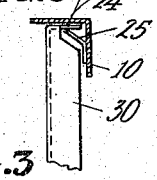
Figure 4:
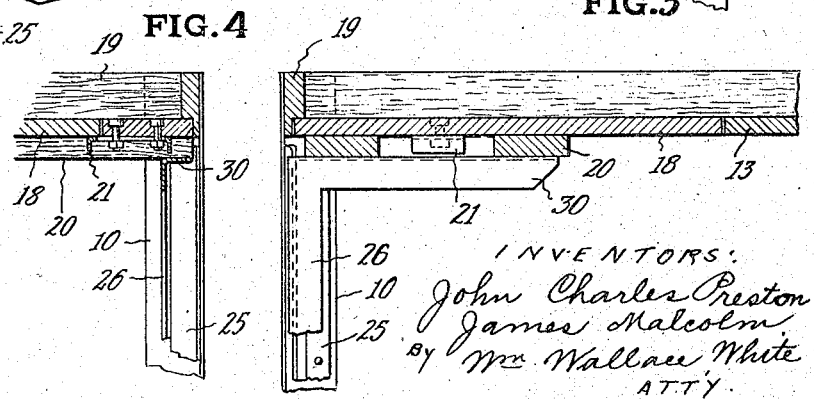

In the accompanying drawing, Figure 1 is a perspective view of a nursery service wagon according to the invention; Fig. 2 a perspective fragment explanatory of a slide bracket mounting on one of the wagon legs, which bracket supports the movable seat section of the upper tray; Fig. 3 is a partial longitudinal section showing the seat raised, as when the structure is arranged for use as a dinner service wagon; Fig. 4 a partial transverse section through the structure showing one of a pair of slide bolts which supports the chair section of the upper tray flush with the fixed part of said tray; Fig. 5 a fragment perspective section showing said slide bolt; and Fig. 6 a fragment transverse section on line 6—6 Fig. 2.

The wagon structure consists of four metal angle legs 10, the lower ends of which are closed up to form tubular pivots for the jaws 11 of caster wheels 12. The upper ledged tray 13 and the lower ledged tray 14 are constructed of wood or of metal and are mounted on said legs by rivets or screw bolts 15. The caster wheels are constructed each of two flanged dished disks fastened together and carrying a rubber tire 16 in the rim. The caster jaws 11 are constructed of sheet metal. A very light structure is thus obtained at a low cost. There is, however, no patentable invention claimed in respect to said structure. The novelty is in constructing the upper tray with a hatch or open portion 17 at one end of it, providing a counterpart plate 18 to fill said hatch, and appropriately mounting said plate 18 so that it may be set flush with the upper tray to fill the hatch 17 (see Figs. 3 and 4) or set intermediate the trays 13 and 14 (see Fig. 1) to form a seat for an infant. In the latter setting, the lower tray 14 provides a rest for the child's feet, and the hatch 17 in the upper tray incloses the infant's body, around or above the waist, thereby to insure safety and comfort and permit the child opportunity to make use of the tray 13 as a play table. The end coaming 19 of the upper tray 13 forms a rest for the infant's back. The distant ends of both trays may be used to carry viands, sewing, or reading matter, or other utilities required at hand.

The plate 18 is carried on a pair of cross battens 20 which in the upper settings (Figs. 3 and 4) take against the underside of the tray 13. A pair of slide bolts 21 carried on countersunk guide hanger bolts 22 working in slide slots 23 in said bolts, function when extended (Fig. 3) to set under the edges of the plate 18 and support it. When they are retired the plate may be dropped to form a seat (see Fig. 1). The battens 20 are mounted on the arms 30 of angle brackets, and the flanges 24 of the leg members 26 of said brackets are slidable in a guideway contained between the leg angles 10 and check angles 25 riveted or spot welded to said leg angles. The lower ends of the check angles 25 are inset as shown at 27 to form stops to limit the downward movement of the legs 26 of the carrier brackets. Similarly, stop checks 29 are formed by insetting the top ends of the check angle.

To adapt the article as a service tray or "dumb waiter", the plate 18 is raised and fixed flush with the tray 13 by extending the bolts 21 (see Figs. 3, 4 and 5). To adapt it as an infant chair and service tray, the bolts 21 are retired, and the plate 18 suffered to drop to the position shown in Fig. 1, the lower ends of the bracket legs 26 then resting upon the lugs 27.

What we claim as our invention and desire to secure by Letters Patent is:—

1. A nursery service wagon consisting of an upper and a lower tray on corner leg supports, a hatch opening in one end of the upper tray, and a movable plate carried on a vertically sliding bracket mounting, said plate adapted when raised to fill said hatch opening and when lowered to form an infant's seat below the same.

2. In a nursery service wagon as defined in claim 1, angle bracket mountings for the movable plate, slide guides therefor formed by check angles fixed to the leg angles, and holding bolts mounted on the underside of the upper tray and adapted to set below said plate when it is brought to the raised position.

3. A nursery service wagon having two trays in tier, and characterized in that a drop down portion of the upper tray is supported on slide brackets independent of the fixed portions of said tray, and is provided with means for fixing it either flush with said upper tray or intermediate said trays and parallel therewith.

In testimony whereof we affix our signatures in the presence of two witnesses.

JOHN CHARLES PRESTON.
JAMES MALCOLM.

Witnesses:
W. G. HUMPHREYS,
H. C. CAMPBELL.